United States Patent [19]
Taguchi et al.

[11] Patent Number: 6,148,253
[45] Date of Patent: Nov. 14, 2000

[54] ON-VEHICLE CONTROL SYSTEM

[75] Inventors: Shuji Taguchi; Fumio Saito; Satoshi Kodama, all of Tokyo, Japan

[73] Assignee: Alpine Electronics, Inc., Tokyo, Japan

[21] Appl. No.: 09/313,467

[22] Filed: May 17, 1999

[30] Foreign Application Priority Data

May 21, 1998 [JP] Japan ................................. 10-139548

[51] Int. Cl.[7] .............................. G06F 7/00; G06F 17/00
[52] U.S. Cl. ......................... 701/48; 701/200; 455/899; 455/457; 370/310; 395/899
[58] Field of Search ................. 701/48, 24, 33, 701/36, 200; 455/899, 457; 370/310; 395/899

[56] References Cited

U.S. PATENT DOCUMENTS

| | | | |
|---|---|---|---|
| 5,544,087 | 8/1996 | Nakajima et al. | 701/200 |
| 5,640,297 | 6/1997 | Labaze | 361/683 |
| 5,699,250 | 12/1997 | Kobayashi | 701/48 |
| 5,732,074 | 3/1998 | Spaur et al. | 370/313 |
| 5,961,569 | 10/1999 | Craport et al. | 701/200 |
| 5,987,394 | 11/1999 | Takakura et al. | 702/123 |
| 5,995,884 | 11/1999 | Allen et al. | 701/24 |

OTHER PUBLICATIONS

GM ready to provides Internet access in some cars; Nov. 2, 1999.

Ford electronic sound system 1989; operating guide.

Primary Examiner—William A. Cuchlinski, Jr.
Assistant Examiner—Olga Hernandez
Attorney, Agent, or Firm—Brinks Hofer Gilson & Lione

[57] ABSTRACT

An on-vehicle control system for controlling various apparatuses mounted on a vehicle contains a front control unit for a front seat passenger and a rear control unit for a rear seat passenger. The front control unit is provided with the functions necessary for driving, such as the navigation control function and audio equipment control function, and the rear control unit is provided with the functions having elements of entertainment, such as the Internet communication function, functions to control games and videos, and audio equipment control function. Thus, the on-vehicle control system enables a user to communicate with the Internet, to concentrate the management of on-vehicle apparatuses, further to control the linking of the functions of the apparatuses, and not sacrifice safe driving or the elements of entertainment.

20 Claims, 15 Drawing Sheets

LAYOUT OF THE VCC SYSTEM OF THE INVENTION

NETWORK ENVIRONMENT THAT THE PRESENT INVENTION CAN BE APPLIED TO.

PRIOR ART

CHART OF THE COMMUNICATION SYSTEM

CONNECTION FUNCTION OF THE CENTER SERVER

INTERNET CONNECTION FUNCTION (GATEWAY FUNCTION)

LINKING FUNCTION WITH A CAR NAVIGATION SYSTEM

DISPLAY IMAGE

CONSTRUCTION OF THE ON-VEHICLE VCC SYSTEM OF THE INVENTION

LAYOUT OF THE VCC SYSTEM OF THE INVENTION

OBJECT OF OPERATION BY THE FRONT SERVER

MENU DISPLAY OF THE FRONT SERVER

MENU DISPLAY OF THE REAR SERVER

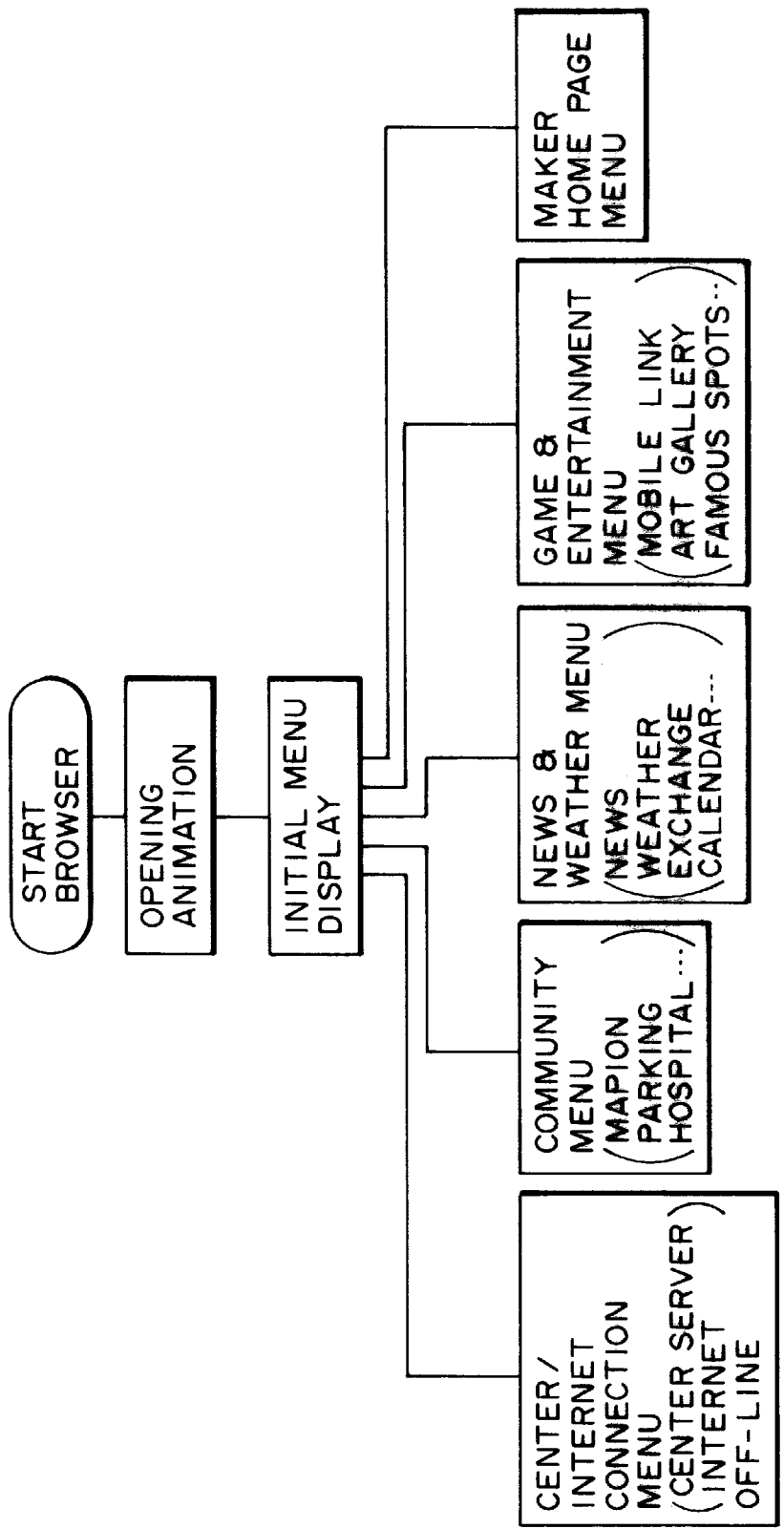

ON-LINE/OFF-LINE CONTROL FLOW OF THE INTERNET TERMINAL BY THE REAR SERVER

CONSTRUCTION OF ANOTHER ON-VEHICLE VCC SYSTEM OF THE INVENTION

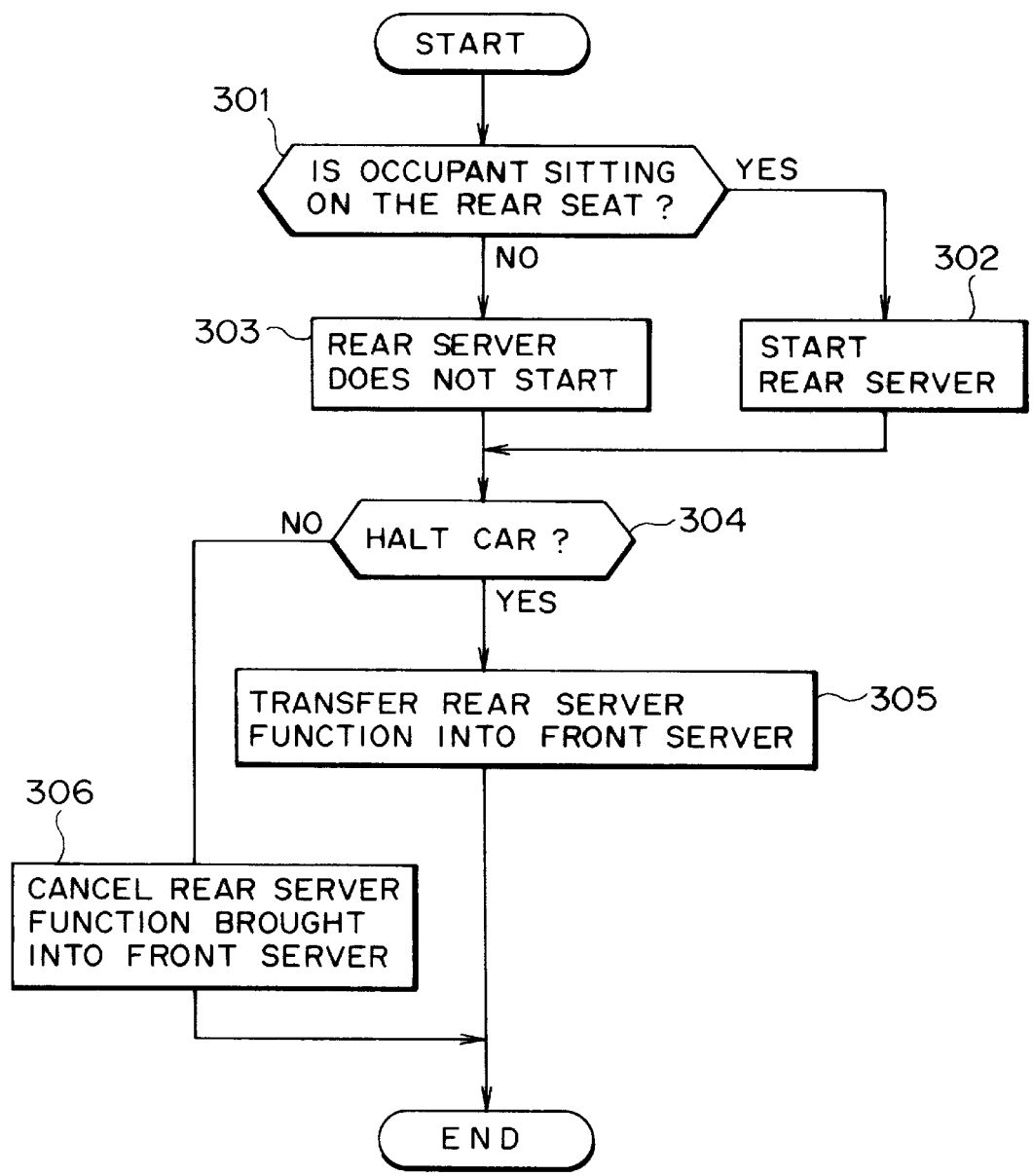

FUNCTION ALLOCATION BASED ON THE STATE OF PASSENGERS AND THE STATE OF TRAVEL/HALT

ON-VEHICLE CONTROL SYSTEM

FIELD OF THE INVENTION

The present invention relates to an on-vehicle control system including a front control unit for a front seat passenger and a rear control unit for a rear seat passenger, which controls on-vehicle apparatuses.

BACKGROUND OF THE INVENTION

On-vehicle apparatuses include on-vehicle audio equipment such as a radio, CD player, and tape recorder; a navigation system a mobile telephone, etc. However, these apparatuses each are operated individually, and each functions independently without mutual links.

On the other hand, owing to the advancement in communication technology, preparedness of communication networks, development of various electronics equipment, and the like, there is an increasing opportunity to use an automobile as a mobile office. Therefore, requests for an on-vehicle control system emerge, having a personal computer mounted on an automobile, and enabling a user to make use of electronic mail or the WWW (World Wide Web) through the Internet, to centralize the management of on-vehicle apparatuses, and to control the linking of functions of various apparatuses.

To develop the on-vehicle control system as mentioned above, it is necessary to consider certain distinctive features of automobiles. Namely, automobiles are intended to travel, and if the on-vehicle control system neglects this feature, it will create a problem for safe driving.

In an automobile, a driver is in a completely different situation from mere passengers, so that an automobile driver and the passengers cannot be regarded as being equivalent. Therefore, an on-vehicle control system designed on a concept regarding all occupants as being equivalent will create a problem for safe driving.

Also, because vehicles are intended to travel, and travelling will alter the reception condition in a vehicle, wireless communication is not always possible. Therefore, it is preferable that some alternative means are provided in the event of a bad reception condition.

Thus, an object of the invention is to provide an on-vehicle control system that enables a user to make use of electronic mail or the WWW through the Internet, to centralize the management of on-vehicle apparatuses, and to control the linking of functions of various apparatuses without involving a sacrifice of safe driving of the automobile or a sacrifice to elements of entertainment.

Another object of the invention is to provide an on-vehicle control system in which the controllable functions are shared between the front seat and the rear seat, where the driving functions are allocated to the front seat and the entertainment functions are allocated to the rear seat.

Another object of the invention is to provide an on-vehicle control system that inhibits the rear control unit when passengers are not present in the rear seat, and provides the front control unit with the functions of the rear control unit when the automobile is stopped.

Another object of the invention is to provide an on-vehicle control system that, even when a bad reception condition prevents communication with the Internet, enables the user to display home page information and provides the feeling as if the user were communicating with the Internet.

SUMMARY OF THE INVENTION

According to the invention, the foregoing objects can be accomplished by an on-vehicle control system that contains a front control unit for a front seat passenger and a rear control unit for a rear seat passenger communicating with each other, and the functions executed by the front control unit and the rear control unit are shared between the two. In this case, the following function sharing is made: the front control unit is provided with the functions necessary for driving, such as the navigation control function and audio equipment control function, etc., while the rear control unit is provided with the functions having elements of entertainment, such as the Internet communication function, navigation control function, functions to control games and videos, audio equipment control function, etc. With the on-vehicle control system thus constructed, the user is able to make use of electronic mail and the WWW through the Internet. It is also possible to concentrate the management of the on-vehicle apparatuses, further to control the linking of functions of the apparatuses, and not sacrifice safe driving and the elements of entertainment.

Further, when a rear seat passenger is not present, the rear control unit is inhibited, and the functions allocated to the rear control unit are shared with the front control unit when the vehicle is stopped. Thus, a useless starting of the rear control unit is eliminated to enhance the value of the system. In addition, in the event that a rear seat passenger is not present, battery consumption can be reduced. Further, the front control unit can carry out the functions of the rear control unit when the vehicle is stopped, which improves the operability of the system.

Furthermore, an Internet terminal as a client is connected to the rear server or control unit, and (1) in the on-line mode, the Internet terminal displays home page information acquired from the Internet through the rear server, and the rear server stores the latest home page information obtained by connecting to the Internet, while (2) in the off-line mode, the Internet terminal displays the home page information stored in the rear server. With this arrangement, when communication with the Internet is impossible due to a bad reception condition, a user is able to display the home page information with the feeling as if the user is communicating with the Internet.

BRIEF DESCRIPTION OF THE DRAWINGS

FIG. 12 is a chart explaining a menu of an Internet terminal;

FIG. 15 is a flow chart of a processing flow to alter a function allocation of the present invention.

DETAILED DESCRIPTION OF THE PREFERRED EMBODIMENT (a) Network Environment in which the Invention Can Be Applied FIG. 1 is a chart illustrating a network environment in which the invention can be applied. In the drawing, 1a, 1b, . . . 1n denote vehicles, 2 denotes an information center, 3 represents a portable telephone network, 4 represents a public network, 5 denotes an Internet provider, 6 represents the Internet, and 7 denotes an external center. The vehicles 1a–1n each mount the Vehicle Computing Communication System (VCC system) according to the present invention. The VCC system contains the on-vehicle server (front server, rear server) incorporating a personal computer designed such that the system allows a user (1) to read electronic mail and WWW (home page) information through the Internet, (2) to centralize the control of on-vehicle apparatuses such as car audio, navigation system, mobile telephone, and Internet terminal, and (3) to control the linking of the functions of these apparatuses.

Figure 1:
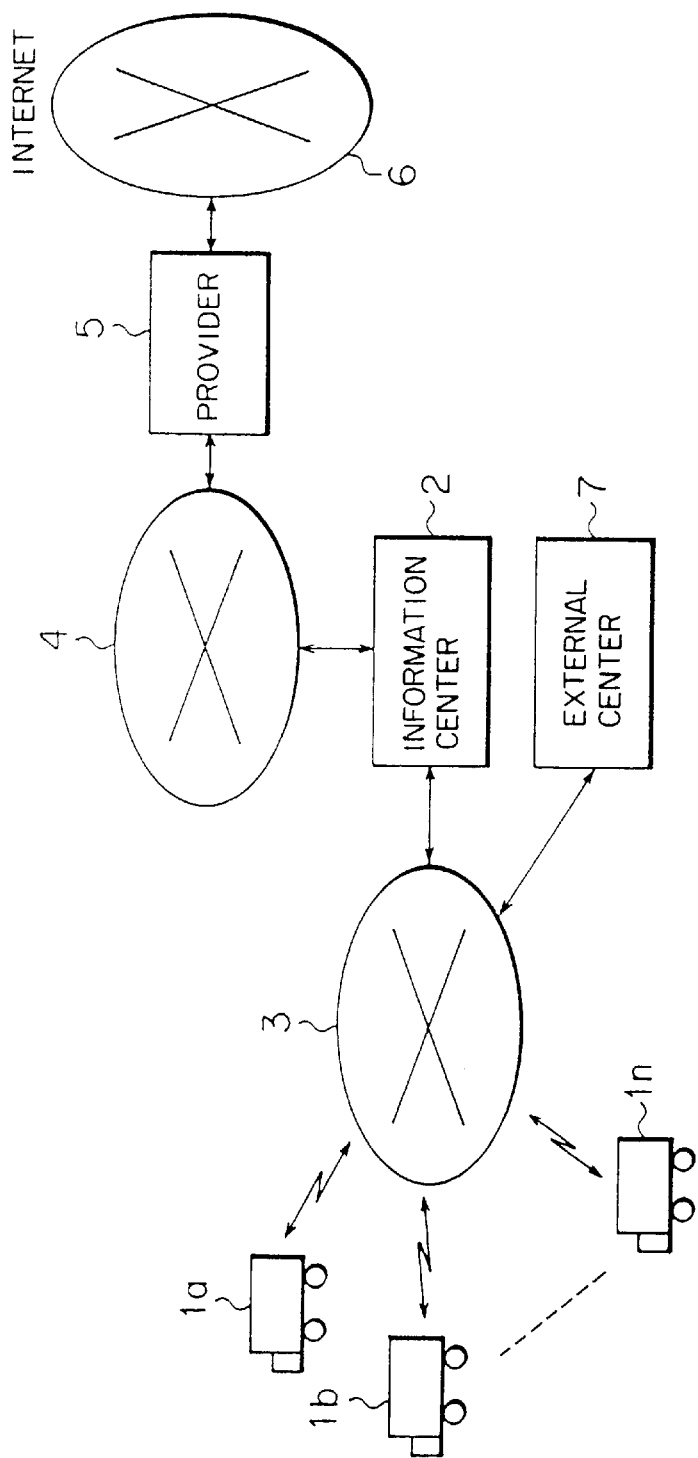
FIG. 1 illustrates a network environment in which the present invention can be applied.

The information center 2 has a central server that receives connection requests from each vehicle. The on-vehicle server is able to obtain and display content from the central server by connecting to the central server of the information center 2 through the portable telephone network 3, to receive the service of the central server, or after connecting to the central server, to connect to the Internet provider 5 through the public network 4 so as to use electronic mail and the WWW.

The external center 7 receives information regarding the condition of the apparatus on each vehicle and any accident that occurred during driving from each vehicle through the portable telephone network 3, and takes necessary steps. When an accident occurs during driving, the on-vehicle server reports the circumstances of the accident regarding the apparatuses of the vehicle automatically to the external server 7 (emergency), and reports the circumstances of the accident regarding the apparatuses of the vehicle automatically to the external server 7 (remote maintenance).

(b) Communication System

Figure 2:
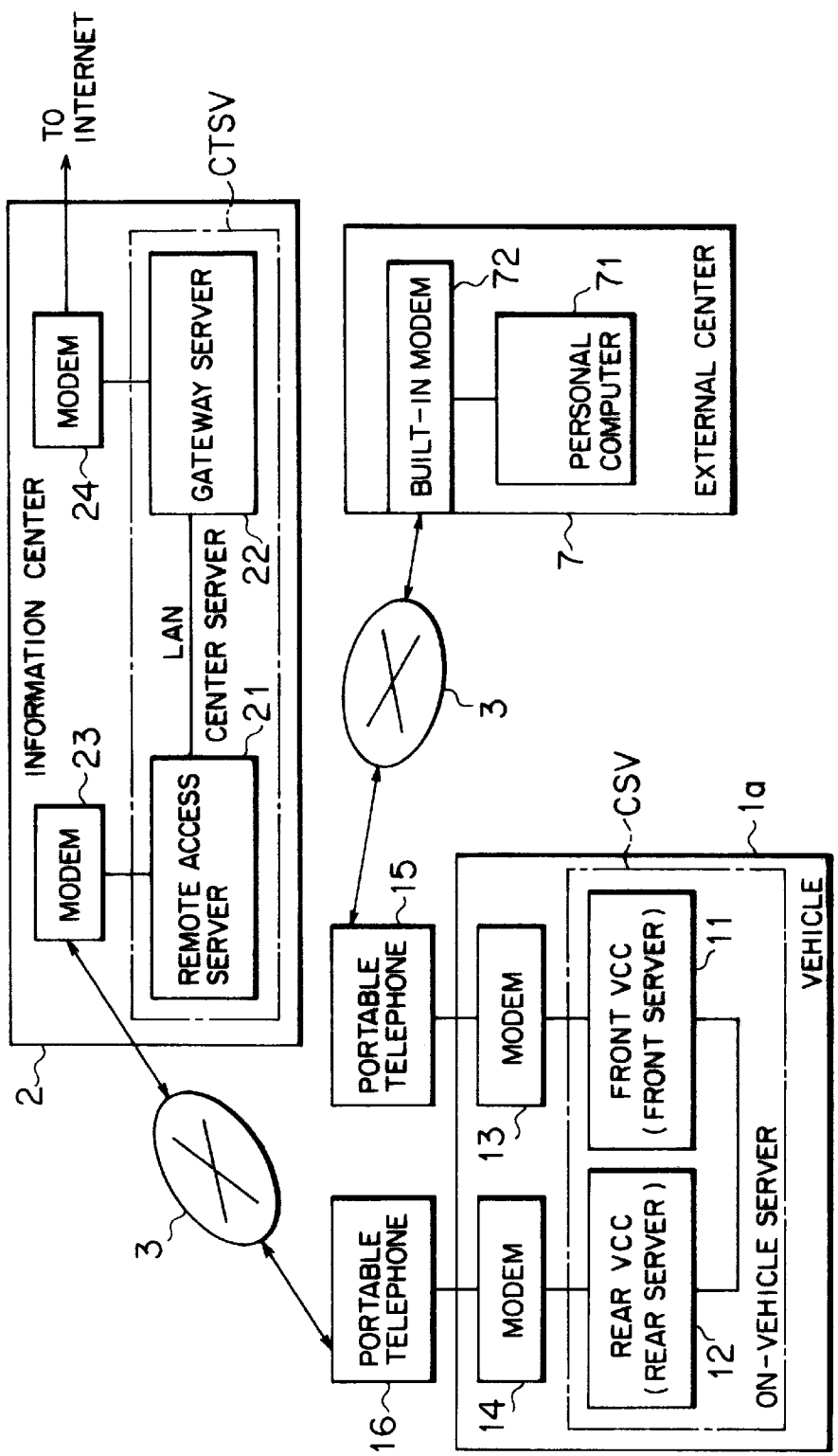
FIG. 2 is a chart explaining the communication system.

FIG. 2 is a chart illustrating a communication system including the vehicle 1a, information center 2, and external center 7, in which the same components as those in FIG. 1 are given the same numerals.

The on-vehicle server CSV of each vehicle enables a front VCC (front server) 11 for a front seat passenger and a rear VCC (rear server) 12 for a rear seat passenger to communicate with each other. The VCC 11 is connected to a modem 13, and the VCC 12 is connected to a modem 14. To these modems 13 and 14 are connected portable telephones 15 and 16, respectively. The central server CTSV of the information center 2 includes a remote access server 21 to receive the connection requests from the vehicles, and a gateway server 22 to implement the connection requests to the Internet. The servers 21 and 22 are inter-connected through a LAN, and are connected to modems 23 and 24, respectively. The external center 7 contains a personal computer 71 and a modem 72, and monitors the state of the vehicle transmitted from the front server 11. The on-vehicle server CSV and the central server CTSV include the following functions.

(1) Connection Function to Central Server

Figure 3:
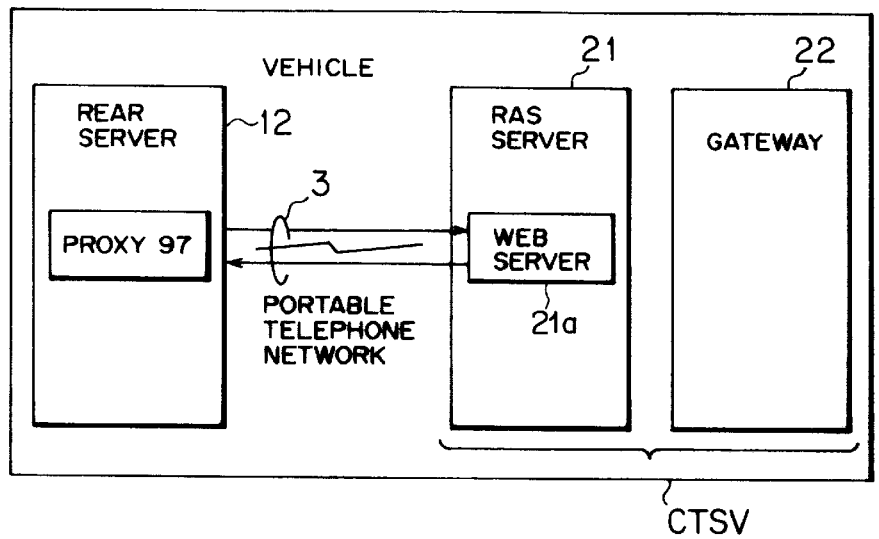
FIG. 3 is a chart explaining the central server connection function.

This function is to connect the rear server 12 to the central server CTSV so as to receive service from the central server. As shown in FIG. 3, the proxy 97 (connection software) on the rear server 12 connects the rear server 12 to the remote access server 21 on the central server CTSV through the portable telephone network 3 in accordance with a request from the Web browser. Once connected, the Web server 21a of the remote access server 21 receives the request and sends content (database information) to the rear server 12 according to the request. The rear server displays the content (database information) received from the central server CTSV, and the rear server thereby becomes able to receive service from the central server CTSV.

(2) Connection Function to the Internet (Gateway Function)

Figure 4:
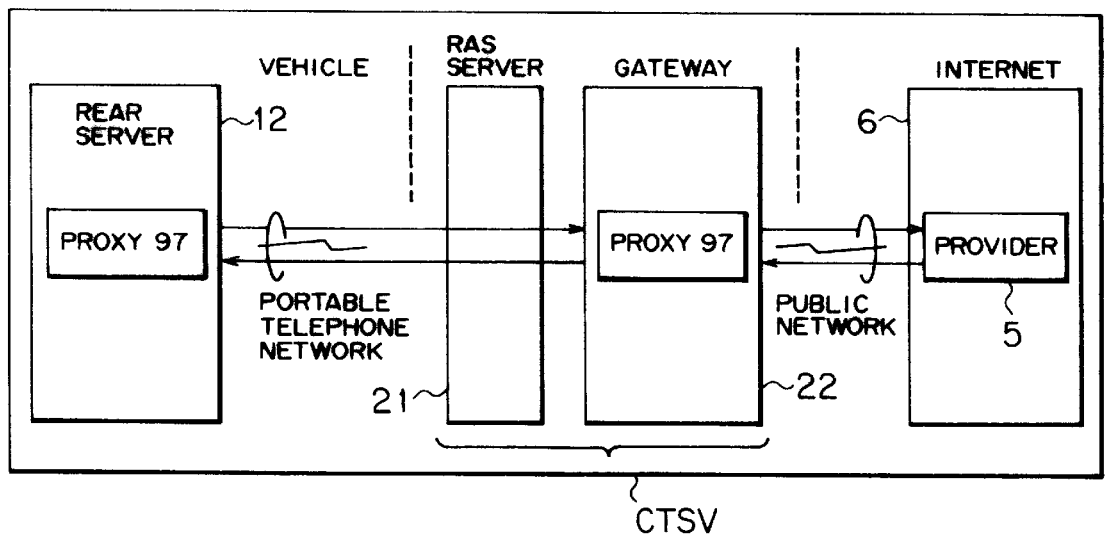
FIG. 4 is a chart explaining an Internet connection function (gateway function)

This function is to connect the rear server 12 to the Internet, which enables the rear server to read the contents of electronic mails and Internet Webs. As shown in FIG. 4, after receiving a request to connect to the Internet from the Web browser, the proxy 97 on the rear server 12 connects the rear server 12 to the central server CTSV through the portable telephone network 3. The request from the rear server 12 is connected to the server (Internet provider) 5 of the Internet via the proxy 97 on the gateway server 22. That is, if the request from the browser on the rear server 12 is a connection request to the Internet, after being connected to the central server the request is further connected therefrom to the Internet provider 5 using the public network 4.

After being connected to the Internet, the rear server will be able to read the contents (map information) of a Mapion map as one of the electronic mails and the Internet Webs, and to read the contents of other Internet Webs. The information from the Internet is sent to the rear server 12 following the reverse route.

(3) Linking Function with Car Navigation System

This function allows a user to select a destination on the Mapion map (Internet map) acquired through the Internet and input the destination to the navigation system, and thereby instruct the navigation system to execute the route search to the destination and display the searched route.

Figure 5:
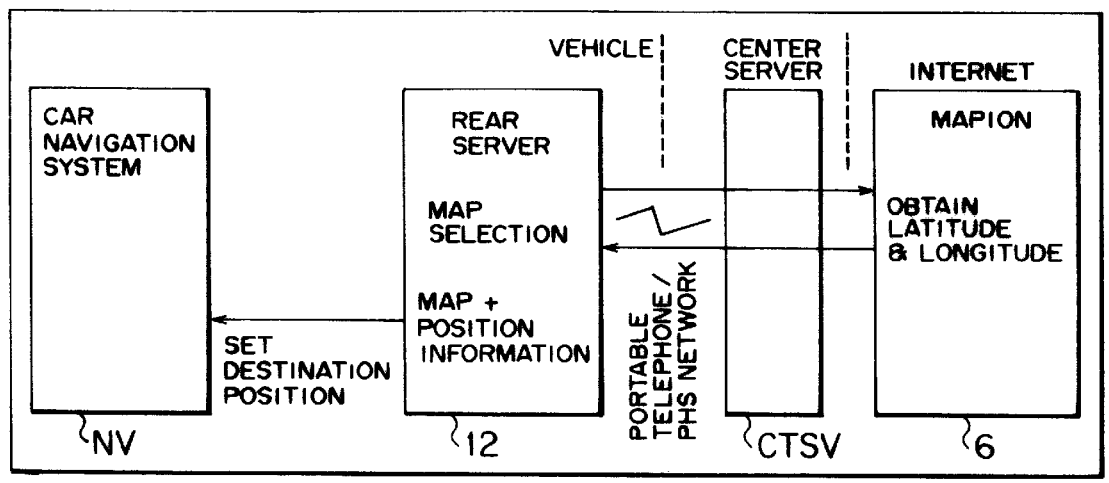
FIG. 5 is a chart explaining a linking function with a car navigation system.
Figure 5:
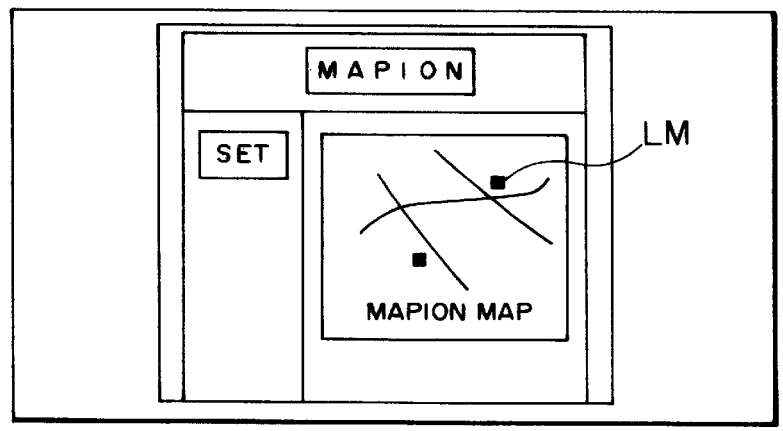

As shown in FIG. 5(a), a user connects the rear server 12 to the Internet 6, and the rear server acquires the contents (map information) of the Mapion map as one of the Internet Webs and displays the result on the monitor (FIG. 5(b)). Next, the user selects a destination by pointing to a spot on the map, a land mark LM, for example, and presses a position setting button to input the position information as the destination, embedded in the Mapion map, into the car navigation system NV. Thereby, the car navigation system NV searches the route to the destination, and displays the route obtained.

(c) Construction of VCC System

Figure 6:
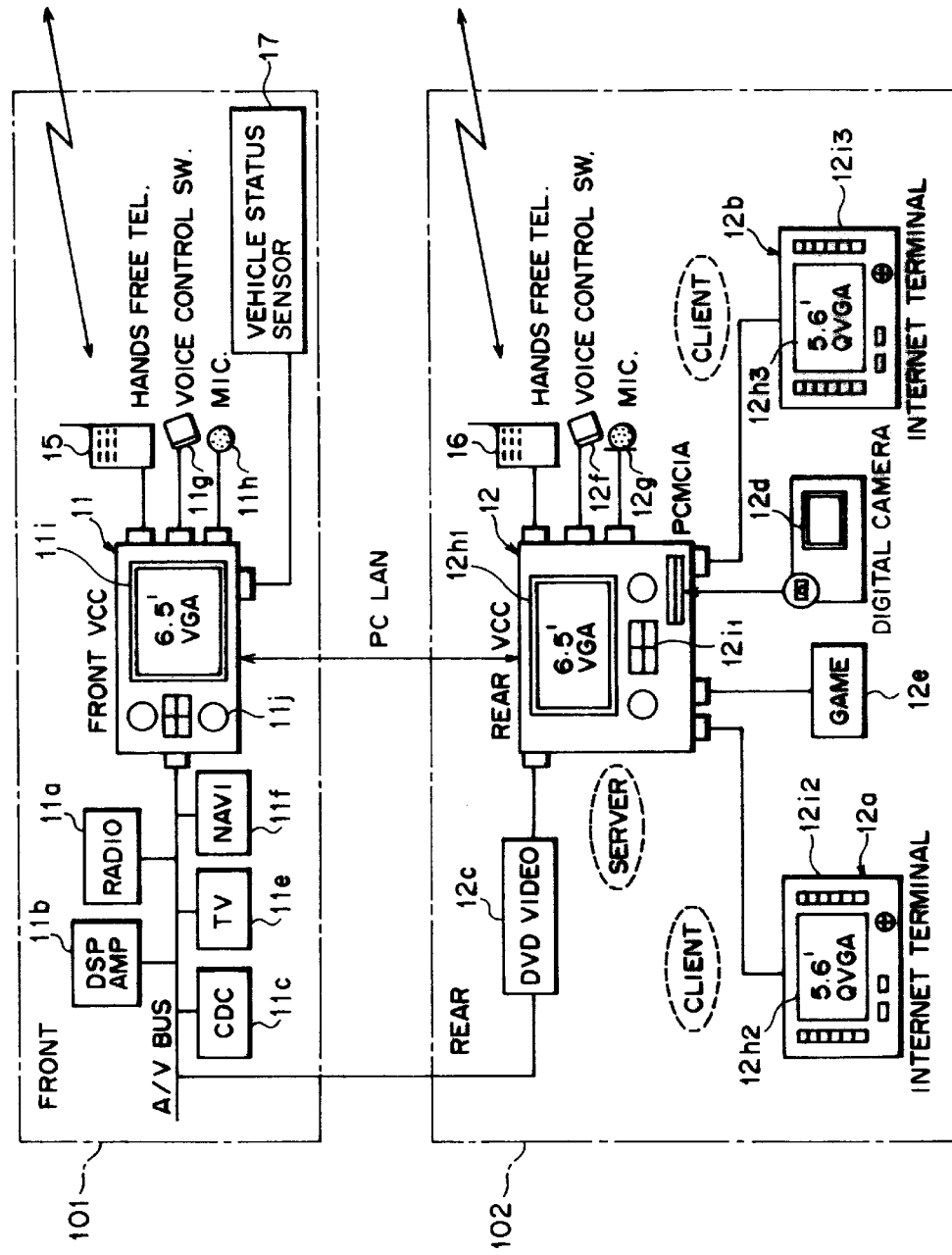
FIG. 6 is a block diagram of an on-vehicle VCC system according to the present invention.

FIG. 6 illustrates one construction of the on-vehicle VCC system of the present invention, in which 101 illustrates one construction of the front VCC system, and 102 illustrates the rear VCC system to make up a multi-user system.

In the front system 101, 11 signifies a front server (front VCC) comprising a personal computer, 11a an AM/FM radio tuner, 11b an amplifier of the DSP configuration, 11c a CD player with a changer, 11e a TV set, 11f a navigation system, 11g a voice control switch, 11h a microphone for voice input, 11i a monitor for the front server, 11j buttons of the front server, 15 a hands-free mobile telephone, and 17 a vehicle status detection sensor to detect the state of each unit in a vehicle (air bag sensor, oil gage sensor, etc.).

In the rear system 102, 12 signifies a rear server (rear VCC) comprising a personal computer, 12a and 12b signify Internet terminals comprising personal computers and have the relation of server/clients with the rear server 12. 12c denotes a DVD video deck, 12d a digital camera, 12e a game terminal, 12f a voice control switch, 12g a microphone for a voice input, $12h_1$–$12h_3$ monitors of the rear server and the Internet terminals, $12i_1$–$12i_3$ buttons of the rear server and the Internet terminals, and 16 a hands-free mobile telephone. The front server 11 and the rear server 12 are connected by a LAN so as to communicate with each other.

Figure 7:
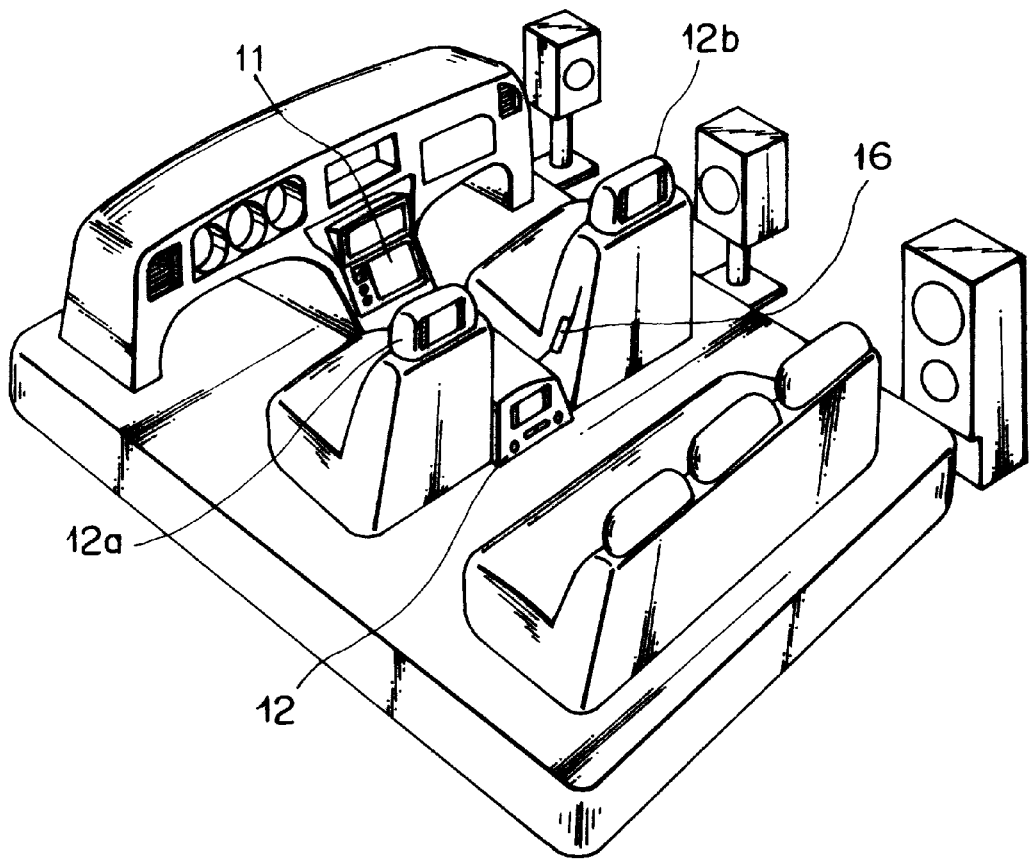
FIG. 7 is a chart explaining a layout of an on-vehicle VCC system according to the present invention.

FIG. 7 is a schematic layout of the important parts constituting the VCC system of the preferred embodiment. The front server 11 is embedded in the front dashboard of a vehicle, the rear server 12 is embedded in the rear portion of the arm rest, and the Internet terminals 12a and 12b are embedded in the rear portions of the head rests of the driver seat and the adjacent seat.

(d) Distribution of Functions

The front server 11 is provided with the functions that are required mainly for driving, and the rear server 12 is provided with the functions mainly for entertainment. That is, the front server 11 bears (1) the function to control audio equipment, (2) the function to control the navigation system, (3) the external communication function (communication with the external center 7), and (4) the speech recognition function for a voice input. The rear server 12 bears (1) the function to control audio equipment, (2) the function to control the navigation system, (3) the function to start other applications, (4) the external communication function (communication with the Internet), (5) the speech recognition function for a voice input, and (6) the function to input video data.

The 'function to control' audio equipment is a function whereby the front server 11 and the rear server 12 control the car audio equipment already mounted on the vehicle.

The 'function to control' the navigation system is a function whereby the front server 11 and the rear server 12 control the car navigation system already mounted on the vehicle. The rear server 12 transmits the latitude and longitude information of a destination acquired through the Mapion map to the navigation system 11f via the front server 11, and the navigation system 11f executes a route search to the destination to present the route guidance, thus enabling the linking control.

The 'external communication function' of the front server is a function that informs the external center 7 of the conditions of apparatuses mounted on a vehicle and any accident that occurred during driving through the modem 13 (in FIG. 2) connected to the front server 11. The 'external communication function' is incorporated into the front server 11; however, this function is not one that a user directly uses, but one automatically operated by means other than the user's operation.

The 'function to start other applications' of the rear server is a function to call the other applications from the rear server 12. For example, the applications that can be called from the rear server 12 include the mail software capable of handling the speech recognition and speech synthesis, the Internet Mail, the Internet Explorer, etc.

The 'external communication function (communication with the Internet)' of the rear server is a function to connect the rear server 12 to the Internet using the modem 14 and the portable telephone 16 (in FIG. 2), which includes the WWW and electronic mail at present. The rear server 12 acquires the map with land marks and the latitude and longitude information at the land mark spots from the WWW Mapion through the Internet Explorer, and displays the result on the monitor. Using the land mark, the rear server sets a destination location and transmits the latitude and longitude of the destination location to the navigation system.

Figure 8:
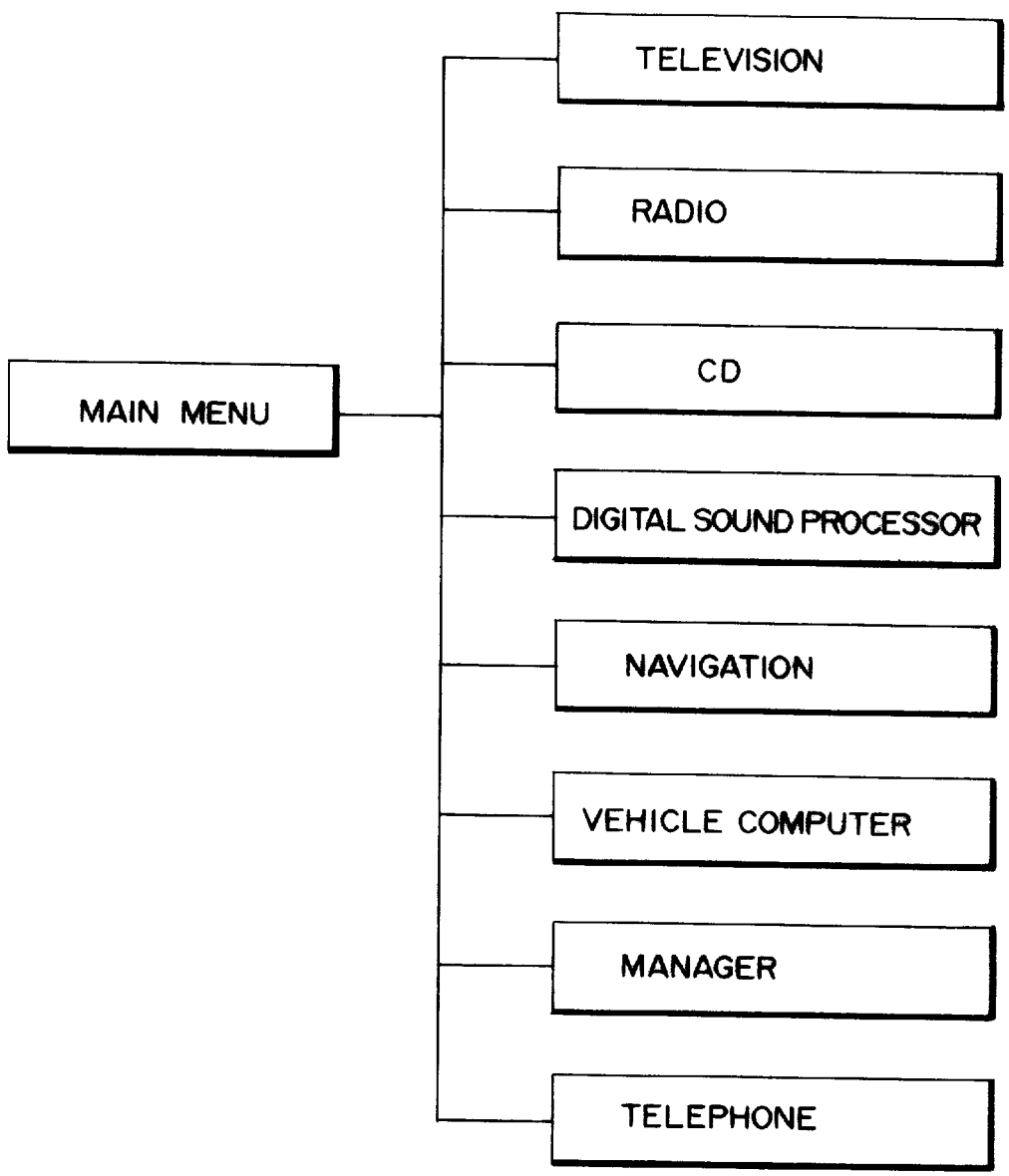
FIG. 8 is a chart explaining apparatuses that the front server may operate.
Figure 9A:
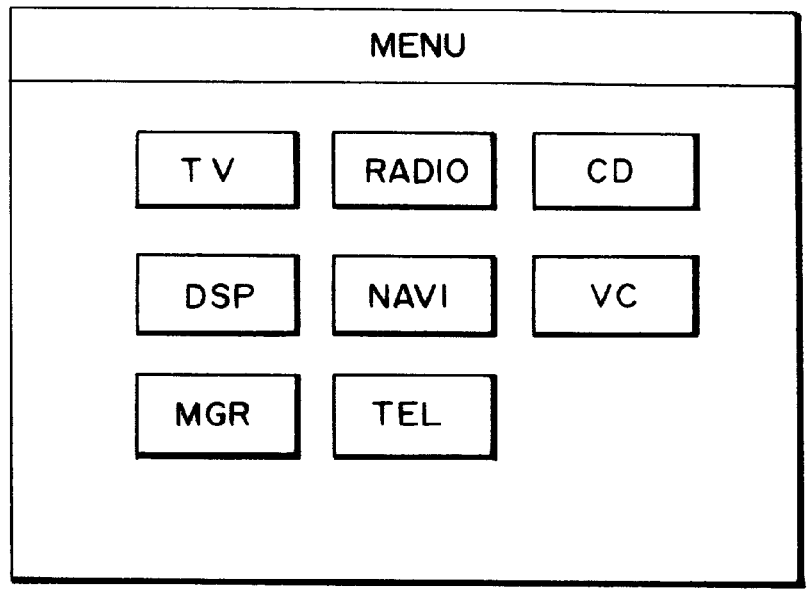
FIG. 9 illustrates a menu display of the front server.
Figure 9B:
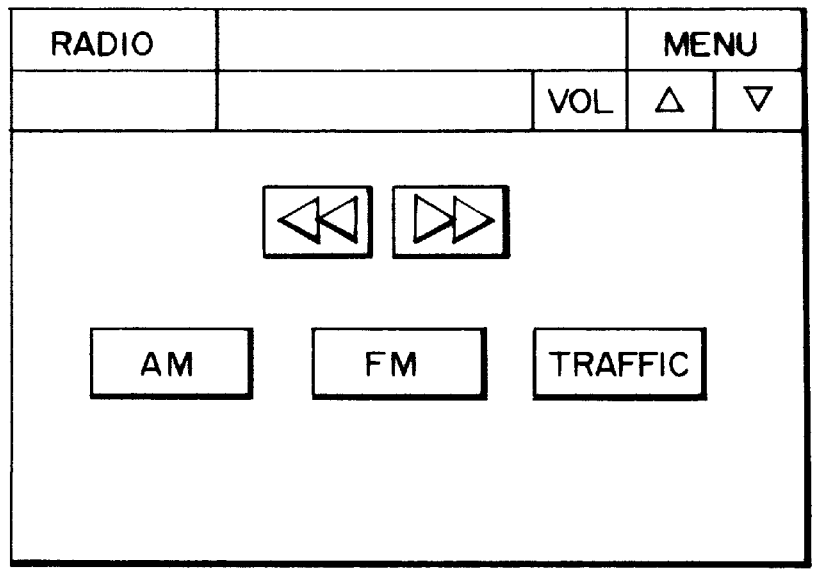

FIG. 8 illustrates the apparatuses that may be operated by the front server 11, which include a television, radio, CD, digital sound processor (DSP), navigation system, on-vehicle computer, manager, and telephone. When a user opens the main menu display (in FIG. 9(a)) of the front server 11, the front server displays the selection menu for the objects of operation. If the user selects a specific object of operation, the front server will permit the user to operate the specified object. If the user selects RADIO, for example, the front server presents the operation menu display of the radio, as shown in FIG. 9(b), whereby the user is able to operate the up/down control of the volume, to switch the band into AM or FM, to receive traffic information, and to operate the up-seek and down-seek.

Figure 10:
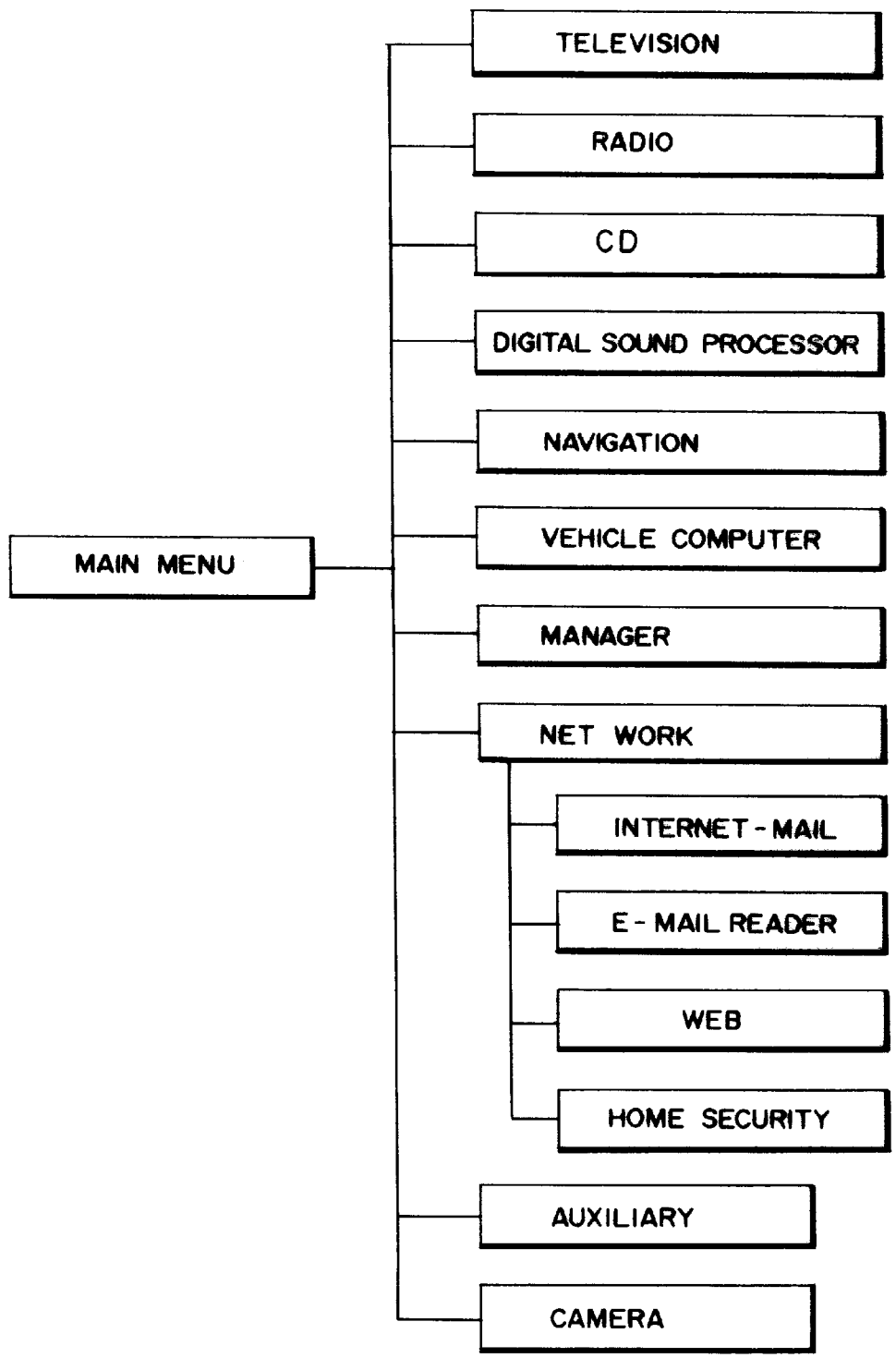
FIG. 10 is a chart explaining apparatuses that the rear server may operate.
Figure 11A:
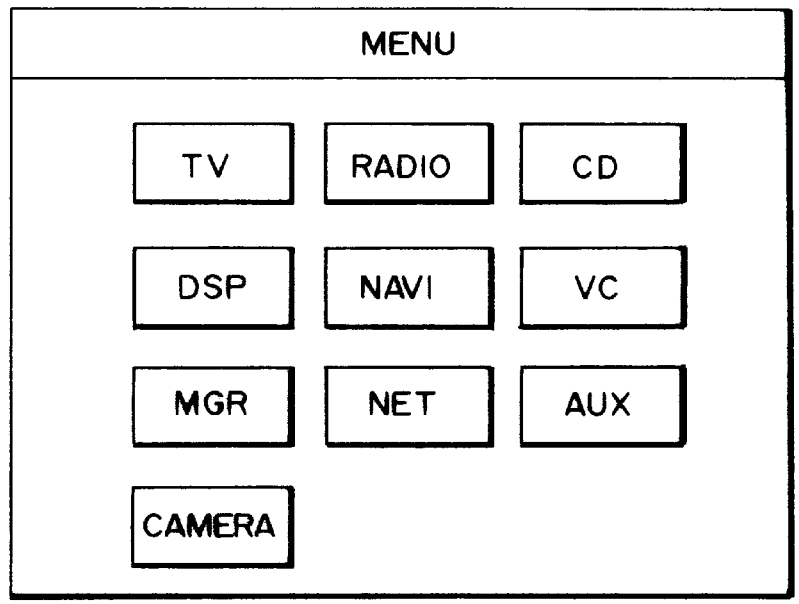
FIG. 11 illustrates a menu display of the rear server.
Figure 11B:
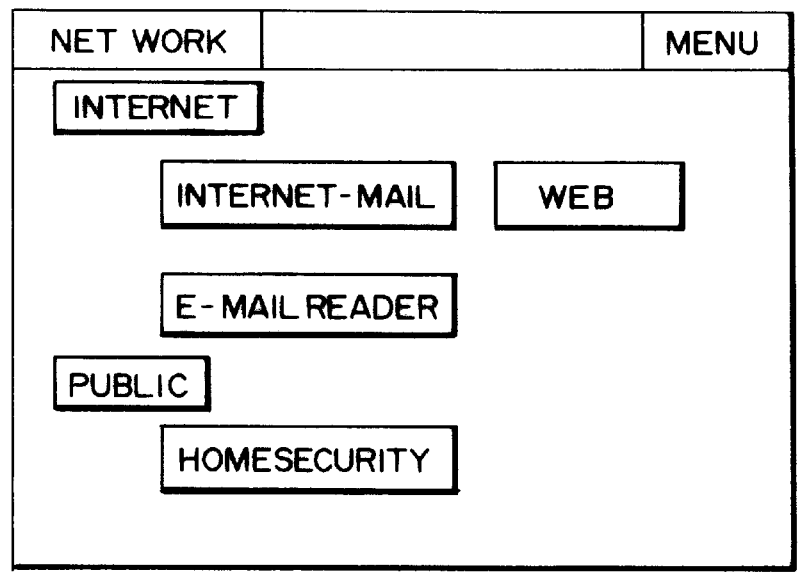

FIG. 10 illustrates the apparatuses that may be operated by the rear server 12, which include a television, radio, CD, digital sound processor (DSP), navigation system, on-vehicle computer, manager, network (Internet Mail, Web, E-mail reader, etc.), and digital camera, for example. When a user opens the main menu display (in FIG. 11(a)) of the rear server 12, the selection menu for these objects of operation is displayed, and the user will be able to select a desired object of operation. If the user selects Network, for example, the rear server presents the sub-menu display (Internet-Mail, Web, E-mail reader, etc.) as shown in FIG. 11(b), whereby the user is able to select a specific function. Here, the E-mail reader carries out a function to read messages received by way of electronic mail.

(e) Operation of Internet Terminal

FIG. 12 illustrates a menu displayed on the monitors of the Internet terminals 12a and 12b (in FIG. 6).

When the Internet terminals 12a and 12b are activated, the browser is started, the opening animation is displayed, and the initial menu is displayed after a certain time. On the initial menu display, the user is able to select (1) central server/Internet connection menu, (2) Community menu, (3) News & Weather menu, (4) Game & Entertainment menu, and (5) maker home page menu.

The central server/Internet connection menu is to select the case (1) that connects the rear server to the central server to receive the service, the case (2) that connects the rear server to the Internet to make use of content of an arbitrary Internet Web, and the case (3) (Off Line mode) that uses each home page information stored in the rear server 12.

The Community menu, News & Weather menu, and Game & Entertainment menu each are the menu by genre, which are used to display the contents by connecting the rear server to a specific Internet Web by genre with a simple operation. If the user selects the Community menu, for example, the Internet terminal displays Mapion to provide map information, Parking to inform the user of the vacancy of parking lots, Hospital to provide hospital information, etc. And then, if the user selects a specific Web, Mapion for example, the rear server is connected to Mapion and is able to display the contents (map information). When the other menu by genre (News & Weather menu, Game & Entertainment menu) is selected, the same will be obtained. Here, the foregoing initial menu display is just one example, and another menu by a different genre can be adopted. It may be arranged to list the menus by genre into a hierarchical structure, and to display for selection a desired content with simplicity.

(f) On-Line/Off-Line Control

Figure 13:
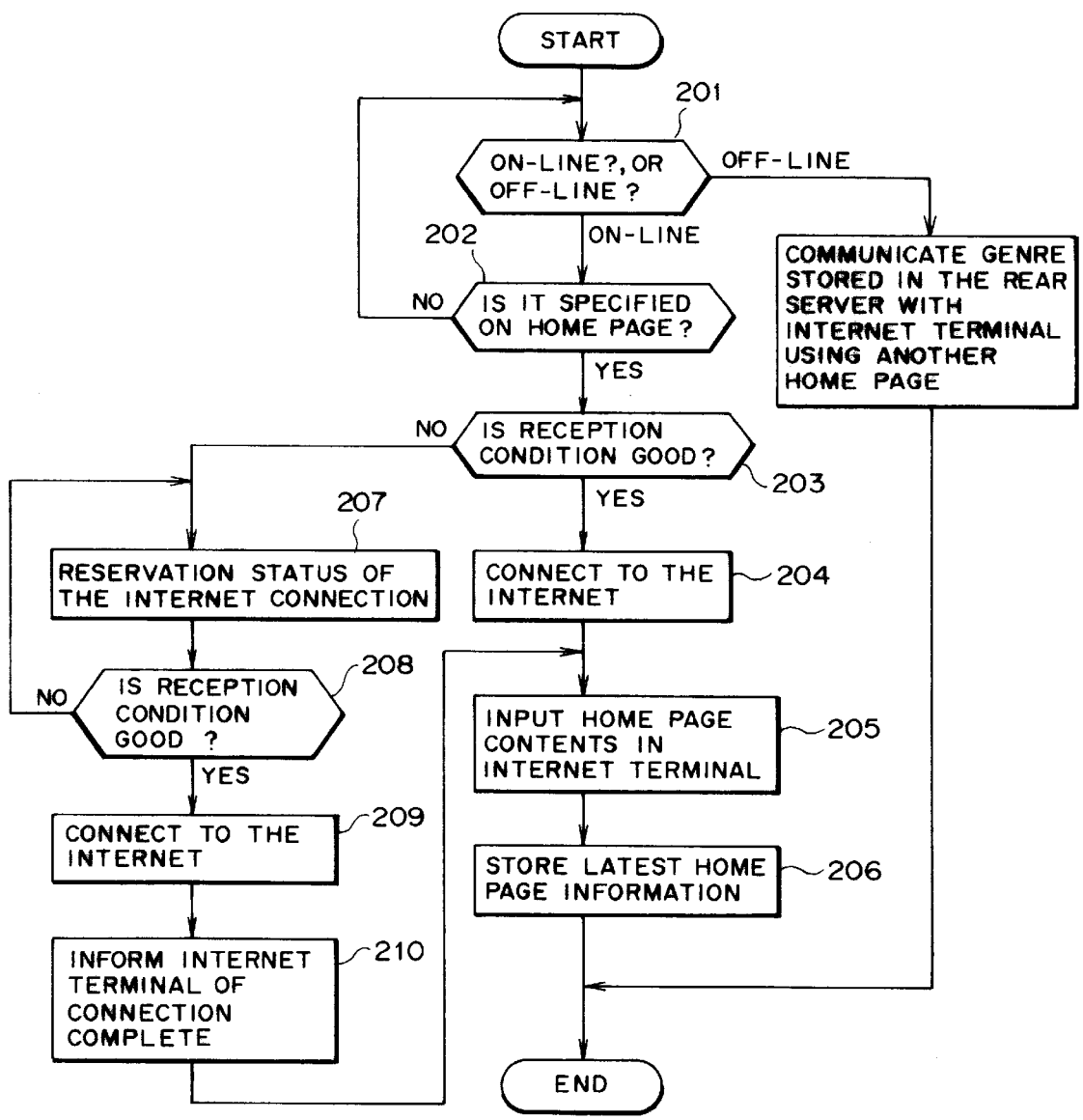
FIG. 13 is a flow chart of an on-line/off-line control flow of the Internet terminal by the rear server.

FIG. 13 illustrates an on-line/off-line control flow of the Internet terminal by the rear server.

On the initial menu display (in FIG. 12) of the Internet terminals 12a, 12b (in FIG. 6), if a user selects the central server/Internet connection menu and then selects the Internet, the rear server will go into the on-line mode (step 201).

In the on-line mode, the user inputs the Internet address of a specific Internet Web, for example, the Internet address of Mapion, and specifies the home page (step 202). Here, if the user makes a menu selection by genre, and selects a specific Internet Web, for example, Mapion, the user can specify the home page without inputting the Internet address.

Next, the rear server 12 receives an incoming signal intensity from the hands-free portable telephone 16 (in FIG. 6), and determines whether the reception state is good (step 203). If the reception state is good, the rear server connects the Internet terminal to the specified Internet Web (Mapion) (step 204). Thereafter, the rear server receives content (map information) from the Internet Web (Mapion), and inputs the content to the Internet terminals 12a, 12b (step 205). And, since the rear server 12 stores the latest contents of each of the Internet Webs received, the rear server updates the storage information of the foregoing Internet Web (Mapion) with the received contents (step 206).

On the other hand, if the reception state is not good at step 203, the rear server informs the Internet terminals 12a, 12b that the connection to the Internet is not possible at present, and waits until the reception state becomes good (reservation state of connecting to the Internet, steps 207, 208). During the reservation state of connecting to the Internet, in the off-line mode, the Internet terminals 12a, 12b are able to employ home page information stored in the rear server 12.

If the reception state becomes good in such a state, the rear server connects the Internet terminal to the Internet Web (Mapion) specified at step 202 (step 209). After completing the connection, the rear server informs the Internet terminals 12a, 12b of the connection being completed (step 210), and thereafter inputs content (map information) received from the Internet Web (Mapion) to the Internet terminals 12a, 12b (step 205). The rear server 12 then updates the storage information of the Internet Web (Mapion) with the received contents (step 206).

On the other hand, at step 201, if the rear server selects the central server/Internet connection menu, and then selects the off-line, the rear server will go into the off-line mode (step 201). In the off-line mode, the Internet terminals 12a, 12b are able to employ each home page by genre that the rear server 12 stores. That is, in the off-line mode, the Internet terminals 12a, 12b select the Internet Web similar to the one in the on-line mode using the menu by genre. Thereby, the rear server 12 sends the home page information of the Internet Web stored therein to the Internet terminals 12a, 12b.

(g) Function Allocation Control

The foregoing on-vehicle VCC system shares the functions between the front server 11 and the rear server 12 to control the on-vehicle apparatuses. However, a passenger is not necessarily present in the rear seat. If a passenger is not present, the rear server will not be activated. Without activating it, the functions allocated to the rear server will not be carried out.

If a driver operates the functions allocated only to the rear server, it will create a danger; therefore, the front server is designed not to execute such functions. However, if the front server carries out these functions during a time the vehicle is stopped, there will not arise any problem.

Accordingly, in this invention, if a passenger is not present in the rear seat, the VCC system does not activate the rear server; and only when the vehicle is stopped, the VCC system provides the front server with the ability to implement functions normally allocated to the rear server.

Figure 14:
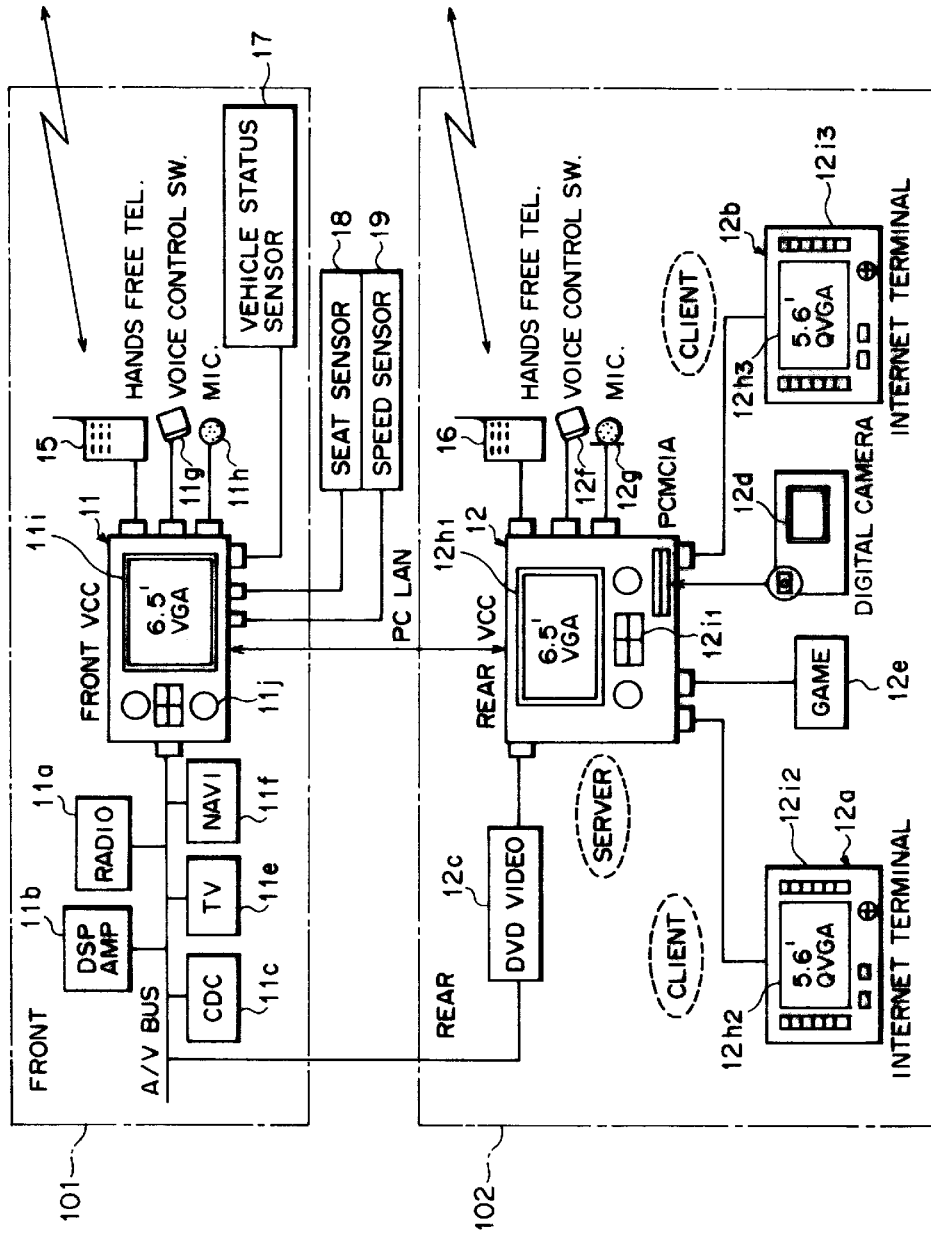
FIG. 14 is a block diagram of another on-vehicle VCC system according the present invention.

FIG. 14 illustrates a construction of the on-vehicle VCC system that can alter the function allocation, in which the same components as in FIG. 6 are given the same numerals. As a point of difference from FIG. 6, the detection signals from the seat sensor 18 and the speed sensor 19 are inputted to the front server 11.

FIG. 15 is a flow chart of the processing to alter the function allocation to the front server 11. When the power switch goes ON, the front server determines whether there is a passenger in the rear seat with the detection signal from the seat sensor 18 (step 301). If there is a passenger in the rear seat, the VCC system starts the rear server 12 (step 302); if not, the VCC system does not start the rear server 12 (step 303). Next, the front server determines whether the vehicle is stopped (in halt) with the detection signal from the speed sensor 19 (step 304); if stopped (in halt), the VCC system enables the front server 11 to execute the functions normally allocated to the rear server 12 (step 305). Thus, during halt, even the front seat can enjoy the Internet communication and video/game, etc., using the front server 11.

On the other hand, if the vehicle is not stopped at step 304, the VCC system prevents the front server 11 from executing the functions allocated to the rear server 12 (step 306). Thereafter, the processing flow returns to the start and repeats the foregoing process.

Figure 16A:
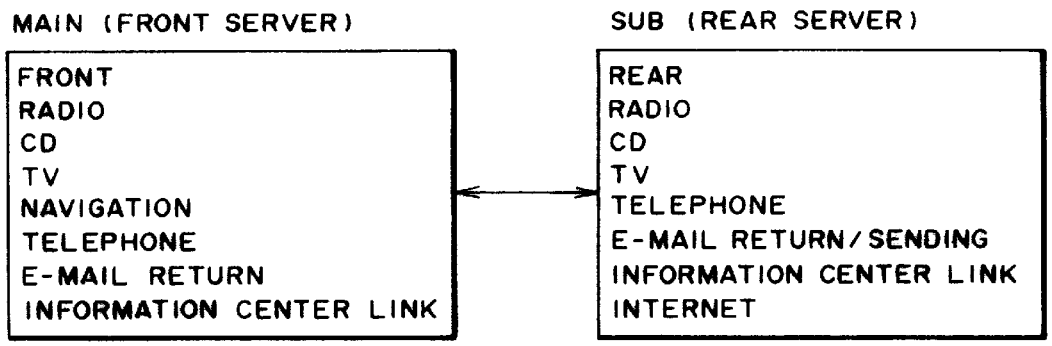
FIG. 16 is a chart explaining the function allocation based on the state of passengers and the travel/stopped state of the car.
Figure 16B:
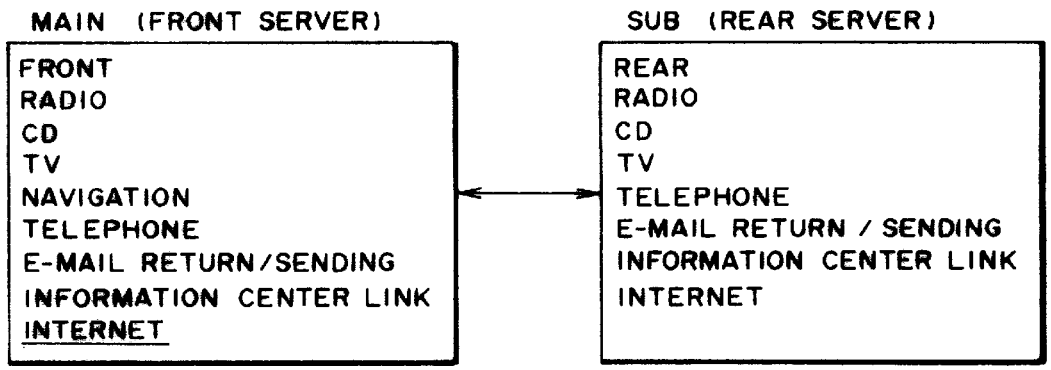
Figure 16C:
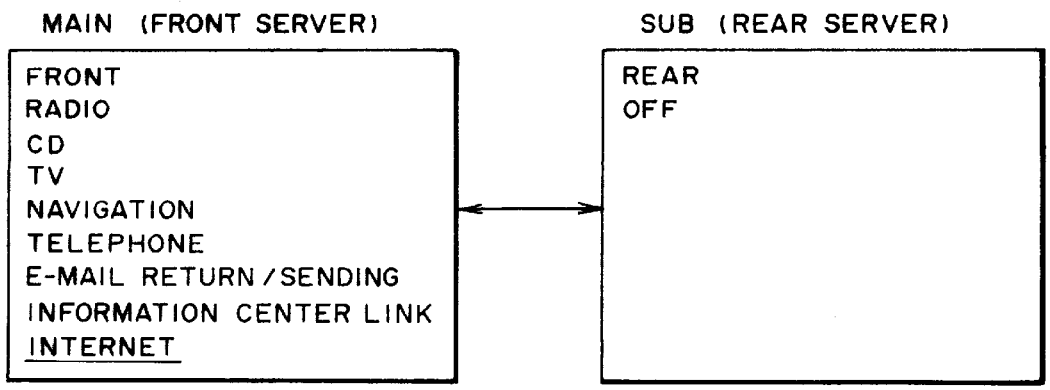

FIG. 16 illustrates the function allocation, in which (a) is a chart explaining the functions of the front server (main) and the rear server (sub) while a vehicle with four persons is in travel, (b) is a chart explaining the functions of the front server and the rear server while the vehicle with four persons is stopped (in halt). During halt, (1) E-Mail transmission function and (2) Internet communication function are newly added to the front server. FIG. 16(c) is a chart explaining the functions of the front server and the rear server while the vehicle with one person is stopped. When there is not passenger in the rear seat, the rear server is not activated, and (1) E-Mail transmission function and (2) Internet communication function are added to the front server.

Although, the present invention has been described in accordance with the preferred embodiment, various modifications and changes are possible within the spirit and scope of the following claims, and are included in the invention.

In accordance with the invention, a front control unit for a front seat passenger and a rear control unit for a rear seat passenger are provided, and the functions executed by the front control unit and the rear control unit are shared between the two. Therefore, the front seat passenger is able to implement the functions mainly required for driving, and the rear seat passenger is able to implement the functions mainly having elements of entertainment. For example, the front control unit is provided with the functions necessary for driving, such as the navigation control function and audio equipment control function, for example, and the rear control unit is provided with the functions having elements of entertainment, such as the Internet communication function, functions to control games and videos, audio equipment control function, for example. To share the functions therebetween will enable a user to make use of electronic mail and the WWW through the Internet. It is also possible to concentrate the management of the on-vehicle apparatuses, further control the linking of the functions of the apparatuses, and not sacrifice safe driving or the elements of entertainment.

Further, in accordance with the invention, when a rear seat passenger is not present, the rear server is not activated, and the functions normally allocated to the rear server are provided to the front server when the vehicle is stopped. Accordingly, a useless starting of the rear server is eliminated to enhance the value of system. Further, in case of the rear seat passenger being absent, battery consumption is reduced, and the front control unit can carry out the functions of the rear control unit when the vehicle is stopped. Therefore, the driver does not need to move to the rear seat each time when the driver wishes to operate the rear server, thus improving the operability of the system.

Further, in accordance with the invention, since the VCC system is designed such that the internet terminal as a client is connected to the rear server, (1) in the on-line mode, the internet terminal displays home page information acquired from the internet through the rear server, and the rear server stores latest home page information obtained by connecting to the internet, and (2) in the off-line mode, because the internet terminal displays the home page information stored in the rear server, a user is able to display the home page information with a feeling as if the user is communicating with the internet, when communication with the Internet is impossible due to a bad reception condition.

What is claimed is:

1. An on-vehicle control system that controls various apparatuses mounted on a vehicle, comprising a front control unit for a front seat passenger and a rear control unit for a rear seat passenger, wherein the front control unit and the rear control unit communicate with each other, and apparatus functions are shared between the front control unit and the rear control unit.

2. An on-vehicle control system as set forth in claim 1, wherein the front control unit and the rear control unit are servers constructed with a personal computer, and are connected to each other on a LAN.

3. An on-vehicle control system as set forth in claim 1, wherein the rear control unit further includes a function having elements of entertainment including a game control function.

4. An on-vehicle control system that controls various apparatuses mounted on a vehicle, comprising a front control unit for a front seat passenger and a rear control unit for a rear seat passenger, wherein the front control unit and the rear control unit communicate with each other and apparatus functions are shared between the front control unit and the rear control unit, and wherein the front control unit and the rear control unit include at least an audio equipment control function for controlling audio equipment, a navigation control function for controlling a navigation system, an external communication function for controlling communication with an external center or the Internet, and a speech recognition function for inputting a voice.

5. An on-vehicle control system as set forth in claim 4, wherein the external communication function is a function to connect the front control unit or the rear control unit to an external center or the Internet through a modem and a portable telephone.

6. An on-vehicle control system as set forth in claim 5, wherein the rear control unit can transmit map information acquired by the external communication function to a navigation system through the front control unit.

7. An on-vehicle control system that controls various apparatuses mounted on a vehicle, comprising a front control unit for a front seat passenger and a rear control unit for a rear seat passenger, wherein the front control unit and the rear control unit communicate with each other, in which system:

apparatus functions are shared between the front control unit and the rear control unit; and the rear control unit is inhibited when a rear seat passenger is not present, and the front control unit bears the functions normally allocated to the rear control unit when the vehicle is stopped.

8. An on-vehicle control system as set forth in claim 7, wherein the front control unit and the rear control unit are servers constructed with a personal computer, and are connected to each other on a LAN.

9. An on-vehicle control system as set forth in claim 7, wherein the presence of a rear seat passenger is detected by a seat sensor.

10. An on-vehicle control system as set forth in claim 7, wherein a stopped state of the vehicle is detected by a speed sensor.

11. An on-vehicle control system as set forth in claim 7, wherein the functions allocated to the rear control unit are functions having elements of entertainment including a game control function.

12. An on-vehicle control system as set forth in claim 7, wherein, when the vehicle is stopped and a rear seat passenger is not present, the rear control unit is inhibited, and at least an E-Mail function is added to the front control unit.

13. An on-vehicle control system as set forth in claim 12, wherein the E-Mail function has a function to read a message received by electronic mail.

14. An on-vehicle control system that controls various apparatuses mounted on a vehicle, comprising a front control unit for a front seat passenger and a rear control unit for a rear seat passenger, wherein the front control unit and the rear control unit communicate with each other, in which system:

apparatus functions are shared between the front control unit and the rear control unit;

an Internet terminal as a client is connected to the rear control unit as a rear server, and the Internet terminal displays home page information obtained from the Internet through the rear server in the on-line mode; and the rear server stores the latest home page information obtained by the Internet connection, and in the off-line mode, the Internet terminal displays the home page information stored in the rear server.

15. An on-vehicle control system as set forth in claim 14, wherein the front control unit and the rear control unit are servers constructed with a personal computer, and are connected to each other on a LAN.

16. An on-vehicle control system as set forth in claim 14, wherein the home page information stored in the rear control unit is updated with the latest one each time the rear control unit accesses the home page information.

17. An on-vehicle control system as set forth in claim 14, wherein the rear control unit is connected to a portable telephone, receives an incoming signal intensity inputted from the telephone, checks whether the reception state is good, and if the reception state is good, connects to the Internet to receive the home page information.

18. An on-vehicle control system as set forth in claim 16, wherein the rear control unit informs the Internet terminal that the connection to the Internet is not possible if the reception state of the signal from the portable telephone is not good, and waits until the reception state becomes good.

19. An on-vehicle control system as set forth in claim 14, wherein, when powered, the Internet terminal starts a browser, displays an opening animation, and presents an initial menu display after a certain time.

20. An on-vehicle control system as set forth in claim 19, wherein the initial menu display presents at least an Internet connection menu for connecting to the Internet.

\* \* \* \* \*

UNITED STATES PATENT AND TRADEMARK OFFICE
CERTIFICATE OF CORRECTION

PATENT NO. : 6,148,253  
DATED : November 14, 2000  
INVENTOR(S) : Shuji Taguchi et al.

Page 1 of 1

It is certified that error appears in the above-identified patent and that said Letters Patent is hereby corrected as shown below:

<u>Claim 18,</u>
Line 1, change "16," to -- 17, --.

Signed and Sealed this

Thirteenth Day of November, 2001

Attest:

*Attesting Officer*

NICHOLAS P. GODICI
*Acting Director of the United States Patent and Trademark Office*